United States Patent Office 3,152,049
Patented Oct. 6, 1964

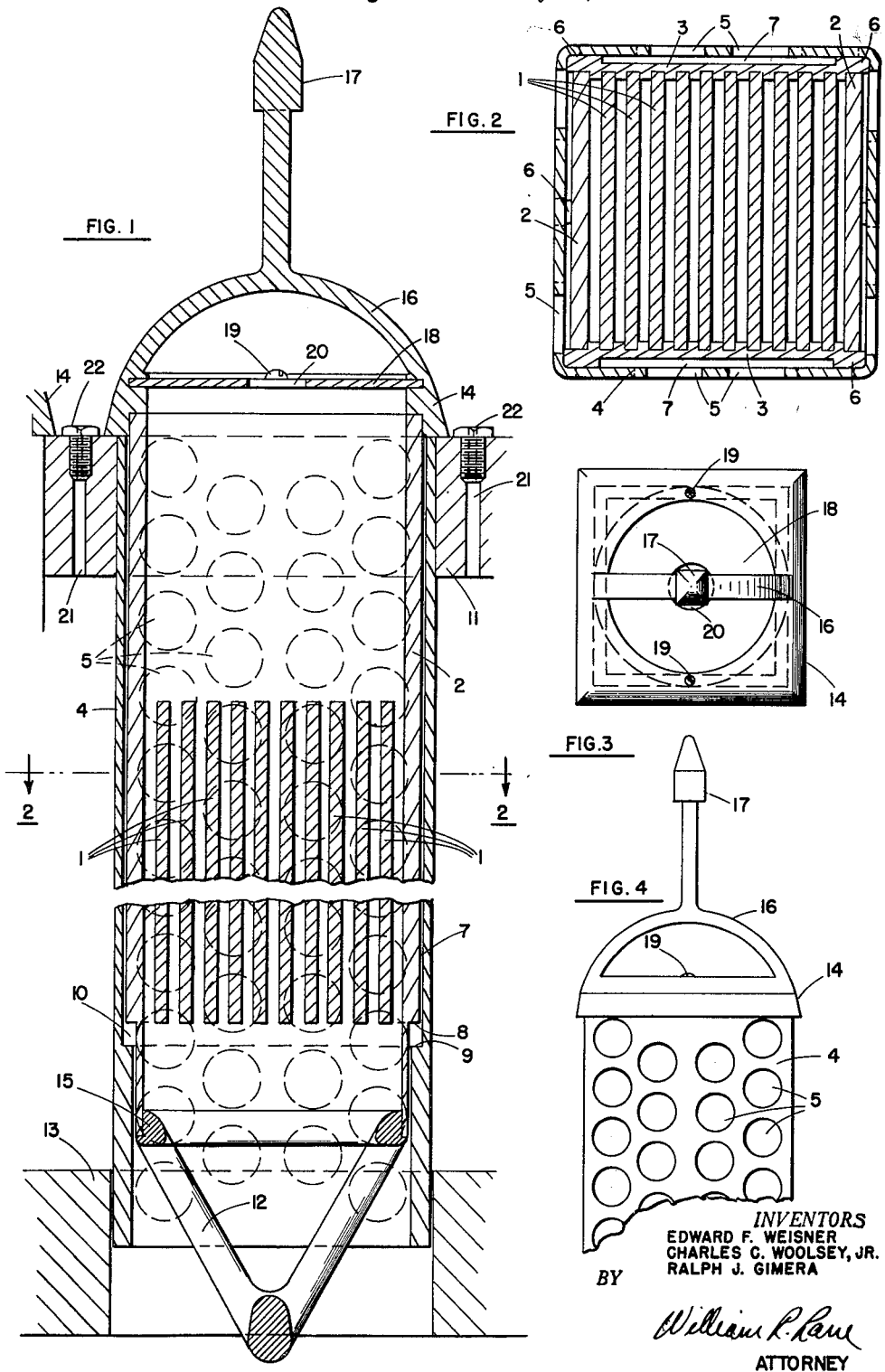
INVENTORS
EDWARD F. WEISNER
CHARLES C. WOOLSEY, JR.
RALPH J. GIMERA

3,152,049
HIGH TEMPERATURE REACTOR FUEL ELEMENT
Edward F. Weisner, Northridge, Charles C. Woolsey, Jr., Calabasas, and Ralph J. Gimera, Woodland Hills, Calif., assignors to North American Aviation, Inc.
Continuation of application Ser. No. 598,665, July 18, 1956. This application Aug. 29, 1960, Ser. No. 53,587
6 Claims. (Cl. 176—40)

Our invention relates to a fuel element for a nuclear reactor, and more particularly to an aluminum-containing fuel element suitable for high temperature application.

For information concerning the theory, construction and operation of nuclear reactors, reference is made to U.S. Patents 2,708,656 and 2,714,577 to Fermi et al.; Glasstone, Principles of Nuclear Reactor Engineering (D. Van Nostrand Co.); Glasstone and Edlund, The Elements of Nuclear Reactor Theory (D. Van Nostrand Co.); Schultz, The Control of Nuclear Reactors in Power Plants (McGraw-Hill); The Proceedings of the Geneva Conference on the Peaceful Uses of Atomic Energy, held in Geneva, Switzerland, August 1955, available for sale at the United Nations' Book Store, New York, New York; and to the references cited therein. For specific information concerning flat plate-type fuel elements and cladding materials, reference is made to Glasstone, supra, pages 763–766.

Unless otherwise indicated, conventional nuclear terminology will be employed herein. For example, "fissionable" material refers to thermal neutron-fissionable isotopes, i.e., U–235, U–233 and Pu–239, and the fertile materials U–382 and thorium, which are capable of conversion to fissionable species upon neutron capture and beta decay. The term "fuel" designates the above materials and embraces the metals, oxides, carbides, powders, sintered compacts and alloys thereof, such as Pu-Th, Pu-U, Th-U and U-Al alloys and $UO_2$. The term "cladding" refers to aluminum and magnesium metals and oxides and alloys thereof, such as aluminum oxide-aluminum alloy.

Aluminum has been extensively employed as a cladding material for fuel elements, including the familiar MTR-type element and the cylindrical slug-type such as used in the Oak Ridge X–10 and Hanford reactors. The widespread use of aluminum in fuel elements is explained by its excellent properties as regards low thermal neutron absorption cross-section, relatively low cost, and satisfactory working properties. Aluminum cannot be used at higher temperatures, however, for several well known reasons. In water, aluminum is corroded at a temperature above approximately 400° F. With gaseous coolants such as helium or carbon dioxide and in organic media, corrosion would not be experienced but rapid loss of strength and other accompanying phenomena such as creep would be experienced above approximately 400° F. (Similar physical properties are shown by magnesium whose use would also be desirable from a nuclear viewpoint.) As a result of these characteristics of aluminum, stainless steel or zirconium are instead commonly used as the cladding material for elevated temperature applications. While these materials are satisfactory from a corrosion and strength viewpoint, severe economic drawbacks accompany their use. Stainless steel has a higher thermal neutron cross-section than aluminum by a factor of approximately 20, and is relatively more expensive and difficult to work. The high cross-section of stainless steel requires more highly enriched fuel and thus adds greatly to the cost of power production. Zirconium is satisfactory from a nuclear viewpoint and has generally satisfactory mechanical properties; however, it is very expensive and a great deal of its metallurgy is unknown. It would, therefor, be highly desirable to use aluminum (or magnesium) for high temperature applications, providing its weaknesses can be overcome or circumvented.

An object of our present invention, accordingly, is to provide an improved and low cost fuel element for a nuclear reactor.

Another object is to provide an aluminum or magnesium-containing fuel element for high temperature application.

Another object is to provide such a fuel element which overcomes physical deficiencies at elevated temperatures.

Still another object is to provide such a fuel element containing a minimum of other structural material so as not to significantly affect neutron economy.

Other objects and advantages of our invention will become apparent from the following detailed description taken together with the accompanying drawings and the attached claims. In the drawings, FIGURE 1 is a longitudinal section of an embodiment of our fuel element; FIGURE 2 is a section taken through 2—2 of FIGURE 1; FIGURE 3 is a plan view; and FIGURE 4, an elevation view. The present application is a continuation of our prior application S.N. 598,665, filed July 18, 1956 (now abandoned).

In accordance with our present invention, we have provided an improved nuclear reactor fuel element comprising a plurality of spaced, clad fuel plates, side members of said cladding material supporting said fuel plates to form a hollow box assembly, and metal support means for said assembly, said support means minimizing dimensional instability of said assembly.

Our invention retains the principal economical and fabricational benefits of aluminum or magnesium in fuel elements and permits their use at elevated temperatures. The physical weakness of the cladding at elevated temperatures is restrained by the metal support means. There is little loss in neutron economy since the cladding is of low cross-section and the use of the supporting material is kept to a minimum. This arrangement retains the major economic benefits of the cladding and minimizes its unfavorable behavior. Possessing such unique characteristics, our fuel element displays great promise for reducing the unit cost of generating atomic power.

Referring to FIGURES 1 and 2, a plurality of aluminum-clad fuel plates 1 (the cladding may be applied by known metallurgical methods such as hot pressing), plus two non-fuel-bearing aluminum end plates 2, are held in position by aluminum side plates 3 to form a rectangular hollow box assembly. The fuel plates 1 fit into small grooves in side plates 3 where they may be brazed with Al-Si eutectic, 11% Si by weight, or spot welded. The aluminum side plates 3 carry the major load in the support of fuel plates 1 and are thus most subject to mechanical failure; they and end plates 2 extend longitudinally beyond the fuel plates in both directions. The fuel assembly, in turn, fits into an enclosing metal box 4, perforated with many small holes 5 which extend the entire length of the box, minimizing the amount of metal in the box. The box 4 is fabricated of a metal of suitable elevated temperature properties, for example, steel or zirconium, stainless steel being preferred. The box 4 encloses the aluminum assembly and restrains it from bending, buckling, bowing, or other lateral movement due to mechanical, thermal, or pressure stresses; it also acts as a guide during insertion and withdrawal of the assembly from the reactor. The aluminum fuel assembly is not in contact with steel box 4, except where pads 6 on both side and end plates 2 and 3 contact box 4 and act as guides. Coolant can, therefore, flow in the small circumferential, rectangular space 7 between the steel box and the assembly and exit through perforations in the box. We have provided against the characteristic tendency of aluminum to creep at elevated temperatures by providing steps 8 in the aluminum side and end plates opposite the bottom of the fuel plates which engage corresponding steps 9 in the steel side plates. The steps 8 and 9 may be engaged initially or a small gap 10 may be provided, as shown, to allow only a small amount of creep. The gap 10 is determined only by mechanical tolerances since the top of the fuel element must seal on the top grid plate 11. The space between the steps when the fuel element first goes to operating temperature is, in any event, generally less than an inch, for example approximately 0.250 in. The fuel element end assembly 12, which is cast, forms an insertion guide which aids in the insertion of the fuel element assembly into steel box 4, located permanently in the reactor core, and into bottom grid plate 13. Since side plates 3 carry the major load, corresponding, stepped support plates opposite only said side plates may be sufficient to provide substantial support to the fuel assembly; a bottom bracket might also be used.

The means for fastening the top of the fuel assembly is seen in FIGURE 1, taken with FIGURE 3 and FIGURE 4. The perforated outer steel box 4 is welded onto supporting top grid plate 11 and fuel element side and end plates 2 and 3 are welded to an aluminum head assembly 14 and also to end assembly 12 at cross bar 15. The head assembly 14 is cast and includes an extension bar 16 and rod 17 for removal of the fuel assembly. The fuel element has an orifice plate 18 inserted in top aluminum head assembly 14 by two retaining screws 19. The orifice plate regulates the flow of coolant through each fuel assembly through orifice 20. Some coolant may be by-passed through the moderator by-pass orifice channels 21 provided with flow plug 22 located in top grid plate 11 between adjacent fuel assemblies. The down-flow coolant passing through these orifices returns to the main coolant stream through the perforations in the steel box. The fuel element is held in place during operation by its weight and by the down-flow of coolant.

The following table is offered as an example of the use of our fuel element assembly in a particular reactor. This reactor is the organic moderated and cooled design described in the co-pending application of the common assignee, S.N. 586,840, filed May 23, 1956, now abandoned, in the names of J. R. Wetch et al. for "Organic Reactor."

TABLE I
Fuel Element Design Data

| | |
|---|---|
| Number of fuel elements | 124. |
| Dimension of active assemblies | 3.2 in. sq., 5.0 ft. long. |
| Composition of each fuel assembly | 56.5 kg. U, 0.7 kg. Al. |
| Number of fuel plates per assembly | 12. |
| Dimension of uranium fuel plates | 0.085 in. x 3 in. x 60 in. |
| Aluminum cladding thickness | 0.020 in. |
| Hollow box steel wall thickness | 0.050 in. |
| Percent void area of steel box | 50. |
| Aluminum end plate thickness | 0.060 in. |

TABLE I—Continued

| | |
|---|---|
| Aluminum side plate thickness | 0.200 in. |
| Length of side and end plates | 6.5 ft. |
| Distance between steel box box and aluminum side and end plates | 0.030 in. |
| Total fuel | 7000 kg. U. |
| Fuel | 1.3% enriched (in U-235) uranium metal. |
| Fuel element surface temperature | 800° F. |
| Heat flux | 385,000 B.t.u./hr.-ft.² |

The above example is merely illustrative and should not be construed as limiting the scope of our invention, which is inherently very broad. It is expected that those skilled in the art can make variations in our fuel element design that are still within the scope of our invention. In particular, variations can be made in: the upper and lower end members, the grid plate features, the number of fuel plates per element, length of plates, number of creep stop steps, and in the shape and design of the support means. Our invention, therefore, should be limited only as is indicated by the appended claims.

We claim:
1. In a nuclear reactor having a pair of grid plates defining the length of a core, the combination of a hollow, perforated support means rigidly secured in said core and extending the length of said core; a fuel element removably supported in said support means, said fuel element comprising a plurality of clad fuel plates, frame means comprised of said cladding rigidly supporting said fuel plates in spaced parallel relationship, and means on said support means for limiting the creep of said frame means.

2. The combination of claim 1 wherein said hollow support means contains a plurality of perforations normal to said frame means and is welded to one of said grid plates.

3. The combination of claim 1 wherein said last-named means includes opposed, engageable shoulder elements on said support means and said frame means.

4. The combination of claim 1 wherein said support means comprises a thin perforated stainless steel enclosure and said cladding material is aluminum.

5. The combination of claim 1 wherein said frame means includes side plates interconnected with non-fuel-bearing end plates to form a hollow box assembly.

6. The combination of claim 1 including spacer means on said frame means for maintaining said frame means and said support means in spaced parallel relationship.

References Cited in the file of this patent
UNITED STATES PATENTS

| | | |
|---|---|---|
| 2,832,732 | Wigner | Apr. 29, 1958 |
| 2,928,779 | Weills et al. | Mar. 15, 1960 |
| 2,936,273 | Untermeyer | May 10, 1960 |

OTHER REFERENCES
Proceedings of the International Conference on the Peaceful Uses of Atomic Energy, August 1955. Published by U.N., vol. 3, pages 159–161 and 250–251.